(12) United States Patent
Lin et al.

(10) Patent No.: US 10,976,450 B2
(45) Date of Patent: Apr. 13, 2021

(54) COMBINED SCINTILLATION CRYSTAL, COMBINED SCINTILLATION DETECTOR AND RADIATION DETECTION DEVICE

(71) Applicant: RAYCAN TECHNOLOGY CO., LTD. (SU ZHOU), Jiangsu (CN)

(72) Inventors: Li Lin, Jiangsu (CN); Qingguo Xie, Jiangsu (CN); Hao Jiang, Jiangsu (CN)

(73) Assignee: Raycan Technology Co., Ltd. (Suzhou), Jiangsu (CN)

( * ) Notice: Subject to any disclaimer, the term of this patent is extended or adjusted under 35 U.S.C. 154(b) by 0 days.

(21) Appl. No.: 15/545,355

(22) PCT Filed: Dec. 9, 2015

(86) PCT No.: PCT/CN2015/096813
§ 371 (c)(1),
(2) Date: Jul. 21, 2017

(87) PCT Pub. No.: WO2016/119527
PCT Pub. Date: Aug. 4, 2016

(65) Prior Publication Data
US 2018/0011205 A1    Jan. 11, 2018

(30) Foreign Application Priority Data
Jan. 26, 2015   (CN) .......................... 201510038296.0

(51) Int. Cl.
*G01T 1/20* (2006.01)
*G01T 1/202* (2006.01)
(Continued)

(52) U.S. Cl.
CPC ............ *G01T 1/202* (2013.01); *G01T 1/1642* (2013.01); *G01T 1/2008* (2013.01); *G01T 1/2985* (2013.01)

(58) Field of Classification Search
CPC ..... G01T 1/2985; G01T 1/202; G01T 1/2008; G01T 1/248; G01T 1/1642; G01T 1/1603; G01T 1/00
(Continued)

(56) References Cited

U.S. PATENT DOCUMENTS 4,870,667 A    9/1989 Brunnett et al.
5,753,917 A    5/1998 Engdahl
(Continued)

FOREIGN PATENT DOCUMENTS

CN    101166997 A    4/2008
CN    201555955 U    8/2010
(Continued)

OTHER PUBLICATIONS

International Search Report issued for PCT/CN2015/096813; dated Mar. 1, 2016; with English translation.
(Continued)

*Primary Examiner* — Kiho Kim

(57) ABSTRACT

A combined scintillation crystal includes: at least one scintillation crystal A module and a scintillation crystal B module. The scintillation crystal A module and the scintillation crystal B module are scintillation crystal modules with different performances. The scintillation crystal A module comprises at least one scintillation crystal A, and the scintillation crystal B module comprises at least one scintillation crystal B. The sensitivity of the scintillation crystal A is lower than the sensitivity of the scintillation crystal B, and the light output ability of the scintillation crystal A is higher than the light output ability of the scintillation crystal B. The scintillation crystal B module includes a ray incidence plane for receiving rays, and the at least one scintillation crystal module A is arranged at the outer side of the ray incidence plane of the scintillation crystal B module.

20 Claims, 2 Drawing Sheets

(51) Int. Cl.
*G01T 1/164* (2006.01)
*G01T 1/29* (2006.01)

(58) Field of Classification Search
USPC .................................................. 250/363.01
See application file for complete search history.

(56) References Cited

U.S. PATENT DOCUMENTS

| | | | |
|---|---|---|---|
| 5,831,269 A | 11/1998 | Nakamura et al. | |
| 8,952,337 B2* | 2/2015 | Menge | G01T 3/06 250/390.11 |
| 9,606,245 B1* | 3/2017 | Czarnecki | G01T 1/1642 |
| 2004/0061348 A1 | 4/2004 | Takeda et al. | |
| 2004/0178347 A1* | 9/2004 | Murayama | G01T 1/2008 250/367 |
| 2005/0023479 A1* | 2/2005 | Grodzins | G01T 3/06 250/390.11 |
| 2007/0138409 A1 | 6/2007 | Daniel | |
| 2008/0191140 A1* | 8/2008 | McDevitt | G01V 5/0091 250/390.11 |
| 2008/0251728 A1* | 10/2008 | Madden | G01T 1/202 250/367 |
| 2010/0020922 A1* | 1/2010 | Carmi | G01T 1/2985 378/19 |
| 2010/0090115 A1* | 4/2010 | Lerch | G01T 1/20 250/366 |
| 2010/0220833 A1 | 9/2010 | Levene et al. | |
| 2010/0316184 A1* | 12/2010 | Iwanczyk | A61B 6/482 378/19 |
| 2011/0121192 A1* | 5/2011 | Moriya | G21K 4/00 250/370.11 |
| 2011/0204243 A1* | 8/2011 | Bendahan | G01T 1/167 250/367 |
| 2012/0074326 A1* | 3/2012 | Pausch | G01T 3/00 250/362 |
| 2012/0080599 A1* | 4/2012 | Pausch | G01T 3/06 250/362 |
| 2013/0009047 A1* | 1/2013 | Grazioso | G01T 1/202 250/252.1 |
| 2013/0099125 A1* | 4/2013 | Grodzins | G01T 3/06 250/362 |
| 2013/0256538 A1* | 10/2013 | Vogtmeier | G01T 1/2008 250/366 |
| 2014/0001365 A1* | 1/2014 | Akers | G01T 1/2008 250/362 |
| 2014/0042330 A1* | 2/2014 | Gozani | G01V 5/0075 250/367 |
| 2014/0197321 A1* | 7/2014 | Bendahan | G01T 1/2008 250/366 |
| 2014/0209804 A1 | 7/2014 | Lee et al. | |
| 2015/0021489 A1* | 1/2015 | Bogorodzki | G01T 1/208 250/363.08 |
| 2015/0331117 A1* | 11/2015 | Ho | G01T 1/2008 250/367 |
| 2016/0091618 A1* | 3/2016 | Gozani | G01T 1/167 250/367 |

FOREIGN PATENT DOCUMENTS

| | | |
|---|---|---|
| CN | 102426381 A | 4/2012 |
| CN | 103698801 A | 4/2014 |
| CN | 104614754 A | 5/2015 |
| JP | H09211139 A | 8/1997 |
| JP | 2004122820 A | 4/2004 |

OTHER PUBLICATIONS

Extended European Search Report corresponding to Application No. 15879725.8-1003/3236290 PCT/CN2015096813; dated Jul. 13, 2018.

JP Notification of Reasons for Refusal corresponding to Application No. 2017-538386; dated Aug. 6, 2018.

* cited by examiner

US 10,976,450 B2

COMBINED SCINTILLATION CRYSTAL, COMBINED SCINTILLATION DETECTOR AND RADIATION DETECTION DEVICE

This is the U.S. national stage of application of International Patent Application No. PCT/CN2015/096813, filed on Dec. 9, 2015. Priority under 35 U.S.C. § 119(a) and 35 U.S.C. § 365(b) is claimed to Chinese Patent Application No. 201510038296.0, titled "COMBINED SCINTILLATION CRYSTAL, COMBINED SCINTILLATION DETECTOR AND RADIATION DETECTION DEVICE" and filed with the State Intellectual Property Office of the People's Republic of China on Jan. 26, 2015, both of which are incorporated herein by reference in their entireties.

FIELD OF THE INVENTION

The present disclosure relates to the field of radiation detection, and in particular to a combined scintillation crystal structure, a SiPM-based combined scintillation detector structure with the combined scintillation crystal structure and a radiation detection device with the combined scintillation detector structure.

BACKGROUND OF THE INVENTION

A scintillation detector is a radiation detector composed by a scintillation crystal and a photoelectric device, and it provides device support for nuclear physics research, radiation measurement and nuclear medicine imaging device research. A scintillation crystal firstly converts x/γ rays to visible photons, then a photoelectric device converts the visible photons to electric pulse signals, and finally a back end performs differential counting on the electric pulse signals based on an amplitude to obtain radiation information. A silicon photomultiplier (SiPM), as a new-type photoelectric device, has characteristics of small size, high gain, having no requirement for a high voltage and so on. Therefore, the SiPMs gradually replace traditional photo-multiplier tubes (PMT) to be used as the scintillation detector.

The existing scintillation detector is mostly composed by one single type of scintillation crystals. Based on the detector in this structure, the function of a nuclear measuring instrument like an x/γ radiation dosimeter can be realized. However, this type of scintillation detectors in the single scintillation crystal structure has a contradiction between the sensitivity and a linearity range of counting rate. A high-sensitivity detector will generate electric pulse signals of a high counting rate in an intense-radiation field, and will arouse the surface pile-up effect to give rise to information loss on one hand, and put forward high requirements for the performance of a back end signal processing module on the other hand, thereby greatly increasing difficulty of using and cost. A SiPM has a finite dynamic range due to constraints of snow slide recovery time and pixel number, and thus it is difficult for a SiPM to have linear response to wide-range light intensity.

Therefore, on account of the above technical problems, it is necessary to provide a new-type combined scintillation crystal structure, a SiPM-based combined scintillation detector structure with the combined scintillation crystal structure and a radiation detection device with the combined scintillation detector structure, to solve the problem of a contradiction between the sensitivity and a linearity of counting rate in the conventional technology.

SUMMARY OF THE INVENTION

In view of the above, the objective of the present disclosure is to provide a combined scintillation crystal structure, a SiPM-based combined scintillation detector structure with the combined scintillation crystal structure and a radiation detection device with the combined scintillation detector structure, to address the problem of a contradiction between the sensitivity and a linearity of counting rate by using a parameter difference between different scintillation crystals, and break the "bottle neck" of a finite dynamic range of a SiPM.

In order to attain the foregoing objective, technical solutions provided in the present disclosure are as follows. A combined scintillation crystal includes at least one scintillation crystal A module and a scintillation crystal B module, the scintillation crystal A module and the scintillation crystal B module being scintillation crystal modules with different performances. The scintillation crystal A module includes at least one scintillation crystal A, and the scintillation crystal B module includes at least one scintillation crystal B. The sensitivity of the scintillation crystal A is lower than the sensitivity of the scintillation crystal B, and the light output ability of the scintillation crystal A is higher than the light output ability of the scintillation crystal B. The scintillation crystal B module includes a ray incidence plane for receiving rays, and the at least one scintillation crystal module A is arranged at the outer side of a ray incidence plane of the scintillation crystal B module.

According to the combined scintillation crystal, preferably, the scintillation crystal B module includes: a first abutting plane coupled with an external silicon photomultiplier device, a second abutting plane opposite to the first abutting plane and multiple sides connecting the first abutting plane to the second abutting plane and receiving rays; the multiple sides each function as the ray incidence plane of the scintillation crystal B module; the combined scintillation crystal includes multiple scintillation crystal A modules, and the multiple scintillation crystal A modules are arranged respectively on the periphery of the sides of the scintillation crystal B module, and the whole of the multiple scintillation crystal A modules are arranged around all the sides and completely enclose the scintillation crystal B module from the periphery of sides.

According to the combined scintillation crystal, preferably, the multiple scintillation crystal A modules are arranged symmetrically about the scintillation crystal B module in at least one direction.

According to the combined scintillation crystal, preferably, the multiple scintillation crystal A modules are arranged in an area greater than or equal to an area of the ray incidence plane and enclose the scintillation crystal B module.

According to the combined scintillation crystal, preferably, the scintillation crystal B module includes: a first abutting plane coupled with an external silicon photomultiplier device, a second abutting plane opposite to the first abutting plane and multiple sides connecting the first abutting plane to the second abutting plane and receiving rays; the multiple sides each function as the ray incidence plane of the scintillation crystal B module; the combined scintillation crystal includes multiple scintillation crystal A modules, and the multiple scintillation crystal A modules are arranged respectively on the periphery of at least two sides of the scintillation crystal B module, and the whole of the multiple scintillation crystal A modules enclose incompletely the scintillation crystal B module from the periphery of sides.

According to the combined scintillation crystal, preferably, the multiple scintillation crystal A modules are arranged symmetrically about the scintillation crystal B module in at least one direction.

According to the combined scintillation crystal, preferably, the multiple scintillation crystal A modules are arranged in an area greater than or equal to an area of the ray incidence plane and enclose the scintillation crystal B module.

According to the combined scintillation crystal, preferably, the scintillation crystal B module includes: a first abutting plane coupled with a silicon photomultiplier device, a second abutting plane opposite to the first abutting plane and multiple sides connecting the first abutting plane to the second abutting plane and receiving rays; the multiple sides each function as the ray incidence plane of the scintillation crystal B module; the at least one scintillation crystal A module is arranged on the outside of one of the sides of the scintillation crystal B module.

According to the combined scintillation crystal, preferably, after being arranged, the area of a plane of the at least one scintillation crystal A module abutting on the ray incidence plane is greater than or equal to the area of the ray incidence plane.

According to the combined scintillation crystal, preferably, the at least one scintillation crystal A module is arranged from a place adjacent to the ray incidence plane of the scintillation crystal B module to the outside.

In order to attain the foregoing objective, the present disclosure also provides technical solutions in the following. A combined scintillation crystal includes: X types of scintillation crystals with different performances, where X≥3; the sensitivity of a first type of scintillation crystal in the X types of scintillation crystals with different performances is higher than the sensitivity of the other types of scintillation crystals, and the light output ability of a first type of scintillation crystal in the X types of scintillation crystals with different performances is lower than the light output ability of the other types of scintillation crystals; all the first type of scintillation crystal forms a scintillation crystal B module in an integral structure, and the scintillation crystal B module has a ray incidence plane to receive rays, and the other types of scintillation crystals are arranged on the outer side of the ray incidence plane of the scintillation crystal B module.

According to the combined scintillation crystal, preferably, the arrangement of the other types of scintillation crystals relative to the scintillation crystal B module satisfies a condition that the sensitivity gradually decreases and the light output ability gradually increases in the direction of being away from the scintillation crystal B module.

According to the combined scintillation crystal, preferably, each of the other types of scintillation crystals includes an even number of scintillation crystals, and the even number of scintillation crystals are symmetrically arranged at the outer side of any two symmetric ray incidence planes of the scintillation crystal B module, with the scintillation crystal B module as a symmetry point.

According to the combined scintillation crystal, preferably, the scintillation crystal B module includes: a first abutting plane coupled with an external silicon photomultiplier device, a second abutting plane opposite to the first abutting plane and multiple sides connecting the first abutting plane to the second abutting plane and receiving rays; where the multiple sides each function as the ray incidence plane of the scintillation crystal B module; the other types of scintillation crystals are arranged respectively on the periphery of the sides of the scintillation crystal B module, and the whole of the other types of scintillation crystals are arranged around all sides and completely enclose the scintillation crystal B module from the periphery of sides.

According to the combined scintillation crystal, preferably, the arrangement of the other types of scintillation crystals relative to the scintillation crystal B module satisfies a condition that the sensitivity gradually decreases and the light output ability gradually increases in the direction of being away from the scintillation crystal B module.

According to the combined scintillation crystal, preferably, each of the other types of scintillation crystal are arranged symmetrically about the scintillation crystal B module in at least one direction.

According to the combined scintillation crystal, preferably, all the other types of the scintillation crystals are arranged in an area greater than or equal to an area of the ray incidence plane and enclose the scintillation crystal B module.

According to the combined scintillation crystal, preferably, the scintillation crystal B module includes: a first abutting plane coupled with an external silicon photomultiplier device, a second abutting plane opposite to the first abutting plane and multiple sides connecting the first abutting plane to the second abutting plane and receiving rays; the multiple sides each function as the ray incidence plane of the scintillation crystal B module; the other types of scintillation crystals are arranged respectively on the periphery of at least two sides of the scintillation crystal B module, and the whole of the other types of scintillation crystals incompletely enclose the scintillation crystal B module from the periphery of sides.

According to the combined scintillation crystal, preferably, the arrangement of the other types of scintillation crystals relative to the scintillation crystal B module satisfies a condition that the sensitivity gradually decreases and the light output ability gradually increases in the direction of being away from the scintillation crystal B module.

According to the combined scintillation crystal, preferably, each of the other types of scintillation crystals are arranged symmetrically about the scintillation crystal B module in at least one direction.

According to the combined scintillation crystal, preferably, all the other types of the scintillation crystals enclosing the scintillation crystal B module are arranged in an area greater than or equal to an area of the ray incidence plane.

According to the combined scintillation crystal, preferably, the scintillation crystal B module includes: a first abutting plane coupled with an external silicon photomultiplier device, a second abutting plane opposite to the first abutting plane and multiple sides connecting the first abutting plane to the second abutting plane and receiving rays; the multiple sides each function as the ray incidence plane of the scintillation crystal B module; all the other types of scintillation crystals are arranged on the outer side of one of the sides of the scintillation crystal B module.

According to the combined scintillation crystal, preferably, the arrangement of the other types of scintillation crystals relative to the scintillation crystal B module satisfies a condition that the sensitivity gradually decreases and the light output ability gradually increases in the direction of being away from the scintillation crystal B module.

According to the combined scintillation crystal, preferably, after being arranged, the area of a plane of all the other types of scintillation crystals abutting on the ray incidence plane is greater than or equal to the area of the ray incidence plane.

In order to attain the foregoing objective, the present disclosure also provides technical solutions in the following.

A combined scintillation detector includes a SiPM device and a signal processing module, and the combined scintillation detector includes the above combined scintillation crystals.

In order to attain the foregoing objective, the present disclosure also provides technical solutions in the following. A radiation detection device includes a shell and a displayer, and the radiation detection device includes the above combined scintillation detector.

Compared to the prior art, the foregoing technical solutions have advantage 1-11 as follows.

1. A combined scintillation crystal disclosed in the present disclosure includes at least one scintillation crystal A module and a scintillation crystal B module. The scintillation crystal A module and the scintillation crystal B module are scintillation crystal modules with different performances. The scintillation crystal A module includes at least one scintillation crystal A, and the scintillation crystal B module includes at least one scintillation crystal B. The sensitivity of the scintillation crystal A is lower than the sensitivity of the scintillation crystal B, and the light output ability of the scintillation crystal A is higher than the light output ability of the scintillation crystal B. The scintillation crystal B module includes a ray incidence plane for receiving rays, and the at least one scintillation crystal module A is arranged at the outer side of a ray incidence plane of the scintillation crystal B module. By choosing a scintillation crystal A and a scintillation crystal B with different performances, the present technical solution addresses the problem of a contradiction between the sensitivity and a linearity of counting rate by using a parameter difference between different scintillation crystals, and can break the "bottle neck" of a finite dynamic range of a SiPM by reasonable parameter selection. Specifically, by choosing a scintillation crystal A with low sensitivity and high light output capability and a scintillation crystal B with high sensitivity and low light output capability, a great amount of low-energy rays are deposited in the scintillation crystals A of a high photon efficiency and a great amount of high-energy rays are deposited in the scintillation crystals B of a low photon efficiency, thus avoiding SiPM saturation caused by the generation of excessive photons, effectively addressing the problem of an insufficient dynamic range when using a SiPM in cooperation with the scintillation crystal, and effectively easing the contradiction between a wide range of counting rate and the requirement of high sensitivity.

2. The scintillation crystal B module includes: a first abutting plane coupled with an external silicon photomultiplier device, a second abutting plane opposite to the first abutting plane and multiple sides connecting the first abutting plane to the second abutting plane and receiving rays. The multiple sides each function as the ray incidence plane of the scintillation crystal B module. There is multiple scintillation crystal A modules, and the multiple scintillation crystal A modules are arranged respectively on the periphery of each side of the scintillation crystal B module, and the whole of the multiple scintillation crystal A modules are arranged around all the sides and completely enclose the scintillation crystal B module from the periphery of sides. By using scintillation crystals A to completely enclose the scintillation crystal B module in the present technical solution, not only rays can irradiate the combined scintillation crystal from different directions, but also the complete enclosing further guarantees the effect of ray deposition, so that it is convenient to acquire effective and easy-processing signal data. The complete enclosing can also make sure that the response obtained from each direction is consistent when the crystals are arranged symmetrically.

3. The multiple scintillation crystal A modules are arranged symmetrically about the scintillation crystal B module in at least one direction. By using the symmetric arrangement in the present technical solutions, the obtained responses in the two symmetry directions are consistent.

4. The multiple scintillation crystal A modules are arranged in an area greater than or equal to an area of the ray incidence plane and enclose the scintillation crystal B module. The technical solutions ensures all low-energy rays to be largely deposited in the scintillation crystals A of a high photon efficiency and all high-energy rays to be largely deposited in the scintillation crystals B, thus directly and effectively addressing the problem of an insufficient dynamic range when using the SiPM in cooperation with the scintillation crystal, and effectively easing a contradiction between a wide range of counting rate and the requirement of high sensitivity.

5. The scintillation crystal B module includes: a first abutting plane coupled with an external silicon photomultiplier device, a second abutting plane opposite to the first abutting plane and multiple sides connecting the first abutting plane to the second abutting plane and receiving rays. The multiple sides each function as the ray incidence plane of the scintillation crystal B module. There is multiple scintillation crystal A modules, and the multiple scintillation crystal A modules are arranged respectively on the periphery of at least two sides of the scintillation crystal B module, and the whole of the multiple scintillation crystal A modules enclose incompletely the scintillation crystal B module from the periphery of sides. The technical solutions are for some specific applications in which it is unnecessary to detect in all directions. Therefore it can cut the cost by applying the incomplete enclosing of the scintillation crystal B module by the scintillation crystal A modules.

6. The scintillation crystal B module includes: a first abutting plane coupled with a silicon photomultiplier device, a second abutting plane opposite to the first abutting plane and multiple sides connecting the first abutting plane to the second abutting plane and receiving rays. The multiple sides each function as the ray incidence plane of the scintillation crystal B module. The at least one scintillation crystal A module is arranged on the outside of one of the sides of the scintillation crystal B module. The technical solutions are for some special applications in which detection in just one direction is in need. In this case, it only needs to arrange all the scintillation crystal A modules on the outside of one of the sides of the scintillation crystal B module.

7. A combined scintillation crystal includes: X types of scintillation crystals with different performances, where X≥3. The sensitivity of a first type of scintillation crystal in the X types of scintillation crystals with different performances is higher than the sensitivity of the other types of scintillation crystals, and the light output ability of a first type of scintillation crystal in the X types of scintillation crystals with different performances is lower than the light output ability of the other types of scintillation crystals. All the first type of scintillation crystal forms scintillation crystal B module in an integral structure, and the scintillation crystal B module has a ray incidence plane to receive rays, and the other types of scintillation crystals are arranged on the outer side of the ray incidence plane of the scintillation crystal B module. By choosing three or more types of scintillation crystals with different performances, the present technical solutions address the problem of a contradiction between the sensitivity and a linearity of counting rate by using a parameter difference between different scintillation crystals, and can break the "bottle neck" of a finite dynamic range of a SiPM by reasonable parameter selection. By arranging differently based on the sensitivity and the light output capability, the technical solution ensures a great amount of low-energy rays to be deposited in the other types of scintillation crystals of a high photon efficiency and a great amount of high-energy rays to be deposited in the scintillation crystals B of a low photon efficiency, thus avoiding SiPM saturation caused by the generation of excessive photons, effectively addressing the problem of an insufficient dynamic range when using the SiPM in cooperation with the scintillation crystal, and effectively easing a contradiction between a wide range of counting rate and the requirement of high sensitivity.

8. The arrangement of the other types of scintillation crystals relative to the scintillation crystal B module satisfies a condition that the sensitivity gradually decreases and the light output ability gradually increases in the direction of being away from the scintillation crystal B module. The technical solution is made by referring to the design requirements for the case that only two types (i.e., A and B) of detectors exist. When there are more than two types of detectors, to better attain the objective of the present disclosure, the arrangement principles are taken as that the outmost scintillation crystals have lower sensitivity and higher light output capability than the inner scintillation crystals. When multiple types of scintillation crystals are arranged in superposition relative to a ray incidence plane of the scintillation crystal B module, for each adjacent two lays of scintillation crystals, the light output capability of the outer layer of scintillation crystals is higher than the light output capability of the inner layer of scintillation crystal, and the sensitivity of the outer layer of scintillation crystals is lower than the sensitivity of the inner layer of scintillation crystals.

9. Each of the other types of scintillation crystals includes an even number of scintillation crystals, and the even number of scintillation crystals are symmetrically arranged at the outer side of any two symmetric ray incidence planes of the scintillation crystal B module, with the scintillation crystal B module as a symmetry point. When each of the other types of scintillation crystals includes an even number of scintillation crystals, in order to facilitate the later data analyzing and processing, each type of scintillation crystals are arranged symmetrically about the scintillation crystal B module.

10. A combined scintillation detector in the present disclosure includes a SiPM device, a signal processing module and the above combined scintillation crystals. By using the combined scintillation crystal structure, the detector ensures low-energy rays to be deposited in crystals of a high photon efficiency and high-energy rays to be deposited in crystals of a low photon efficiency, thus avoiding SiPM saturation caused by the generation of excessive photons, effectively addressing the problem of an insufficient dynamic range when using the SiPM in cooperation with the scintillation crystal, and effectively easing a contradiction between a wide range of counting rate and the requirement of high sensitivity.

11. A radiation detection device in the present disclosure includes: a shell, a displayer and the above combined scintillation detector. By using the combined scintillation detector structure with the combined scintillation crystal structure, the radiation detection device ensures low-energy rays to be deposited in crystals of a high photon efficiency and high-energy rays to be deposited in crystals of a low photon efficiency, thus avoiding SiPM saturation caused by the generation of excessive photons, effectively addressing the problem of an insufficient dynamic range when using the SiPM in cooperation with the scintillation crystal, and effectively easing a contradiction between a wide range of counting rate and the requirement of high sensitivity.

DETAILED DESCRIPTION OF THE EMBODIMENTS

Disclosed in the present disclosure is a combined scintillation crystal structure, which can address the problem of a contradiction between the sensitivity and a linearity of counting rate by utilizing a parameter difference between different scintillation crystals and can break the "bottle neck" of a finite dynamic range of a SiPM.

The combined scintillation crystal disclosed in the present disclosure may include two types of different performance of scintillation crystals, or include three or more than three types of different performance of scintillation crystals. The two embodiments are described separately in the following.

A first embodiment (two types of different performance of scintillation crystals are included)

Figure 1:
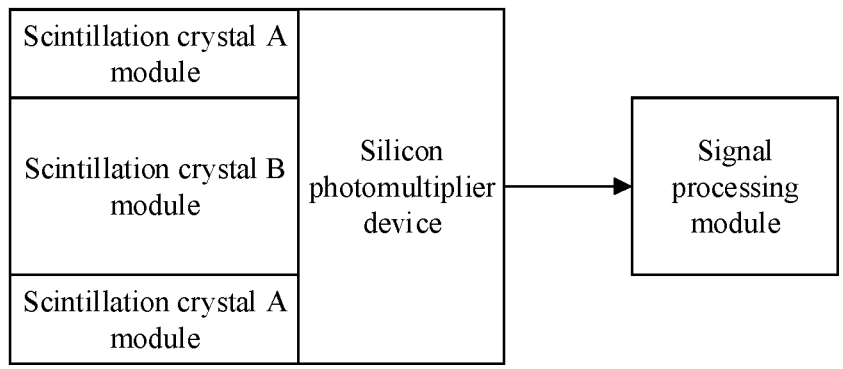
FIG. 1 is a structure diagram illustrating a combined scintillation detector including two types of scintillation crystals provided in the present disclosure.

Referring to FIG. 1, a combined scintillation crystal disclosed in the present disclosure includes at least one scintillation crystal A module and a scintillation crystal B module. The scintillation crystal A module and the scintillation crystal B module are scintillation crystal modules with different performances. The scintillation crystal A module includes at least one scintillation crystal A, and the scintillation crystal B module includes at least one scintillation crystal B. The sensitivity of the scintillation crystal A is lower than the sensitivity of the scintillation crystal B, and the light output ability of the scintillation crystal A is higher than the light output ability of the scintillation crystal B. The scintillation crystal B module includes a ray incidence plane for receiving rays, and the at least one scintillation crystal module A is arranged at the outer side of a ray incidence plane of the scintillation crystal B module. By choosing a scintillation crystal A and a scintillation crystal B with different performances, the present technical solution addresses the problem of a contradiction between the sensitivity and a linearity of counting rate by using a parameter difference between different scintillation crystals, and can break the "bottle neck" of a finite dynamic range of a SiPM by reasonable parameter selection. Specifically, by choosing a scintillation crystal A with low sensitivity and high light output capability and a scintillation crystal B with high sensitivity and low light output capability, a great amount of low-energy rays are deposited in the scintillation crystals A of a high photon efficiency and a great amount of high-energy rays are deposited in the scintillation crystals B of a low photon efficiency, thus avoiding SiPM saturation caused by the generation of excessive photons, effectively addressing the problem of an insufficient dynamic range when using a SiPM in cooperation with the scintillation crystal, and effectively easing the contradiction between a wide range of counting rate and the requirement of high sensitivity.

In the first embodiment, there are three types of positional relationship of the scintillation crystal B module and other types of scintillation crystals. In a first type of positional relationship, the scintillation crystal B module is completely enclosed by the other types of scintillation crystals at the location of a ray incidence plane. In a second type of positional relationship, the scintillation crystal B module is incompletely enclosed by the other types of scintillation crystals at the location of a ray incidence plane. In a third type of positional relationship, the other types of scintillation crystals are arranged at the outer side of one of ray incidence planes of the scintillation crystal B module. The embodiments are described in detail as follows.

The first type of positional relationship is described below, in which the scintillation crystal B module is completely enclosed by the other types of scintillation crystals at the location of a ray incidence plane.

The scintillation crystal B module includes: a first abutting plane coupled with an external silicon photomultiplier device, a second abutting plane opposite to the first abutting plane and multiple sides connecting the first abutting plane to the second abutting plane and receiving rays. The multiple sides each function as the ray incidence plane of the scintillation crystal B module. There is multiple scintillation crystal A modules, and the multiple scintillation crystal A modules are arranged respectively on the periphery of each side of the scintillation crystal B module, and the whole of the multiple scintillation crystal A modules are arranged around all the sides and completely enclose the scintillation crystal B module from the periphery of sides. By using scintillation crystals A to completely enclose the scintillation crystal B module in the present technical solution, not only rays can irradiate the combined scintillation crystal from different directions, but also the complete enclosing further guarantees the effect of ray deposition, so that it is convenient to acquire effective and easy-processing signal data. The complete enclosing can also make sure that the response obtained from each direction is consistent if the scintillation crystal A module itself, the scintillation crystal B module itself, and the scintillation crystal A module relative to the scintillation crystal B module are arranged symmetrically in each direction.

The multiple scintillation crystal A modules are arranged symmetrically about the scintillation crystal B module in at least one direction. By using the symmetric arrangement in the present technical solutions, the obtained responses in the two symmetry directions are consistent, and data processing is more convenient.

The multiple scintillation crystal A modules are arranged in an area greater than or equal to an area of the ray incidence plane and enclose the scintillation crystal B module. The technical solutions ensures all low-energy rays to be largely deposited in the scintillation crystals A of a high photon efficiency and all high-energy rays to be largely deposited in the scintillation crystals B, thus directly and effectively addressing the problem of an insufficient dynamic range when using the SiPM in cooperation with the scintillation crystal, and effectively easing a contradiction between a wide range of counting rate and the requirement of high sensitivity.

The second type of positional relationship is described below, in which the scintillation crystal B module is incompletely enclosed by the other types of scintillation crystals at the location of a ray incidence plane.

The scintillation crystal B module includes: a first abutting plane coupled with an external silicon photomultiplier device, a second abutting plane opposite to the first abutting plane and multiple sides connecting the first abutting plane to the second abutting plane and receiving rays. The multiple sides each function as the ray incidence plane of the scintillation crystal B module. There is multiple scintillation crystal A modules, and the multiple scintillation crystal A modules are arranged respectively on the periphery of at least two sides of the scintillation crystal B module, and the whole of the multiple scintillation crystal A modules enclose incompletely the scintillation crystal B module from the periphery of sides. The technical solutions are for some specific applications in which it is unnecessary to detect in all directions. Therefore it can cut the cost by applying the incomplete enclosing of the scintillation crystal B module by the scintillation crystal A modules.

The multiple scintillation crystal A modules are arranged symmetrically about the scintillation crystal B module in at least one direction. By using the symmetric arrangement in the present technical solutions, the obtained responses in the two symmetry directions are consistent.

The multiple scintillation crystal A modules are arranged in an area greater than or equal to an area of the ray incidence plane and enclose the scintillation crystal B module. The technical solutions ensures all low-energy rays to be largely deposited in the scintillation crystals A of a high photon efficiency and all high-energy rays to be largely deposited in the scintillation crystals B, thus directly and effectively addressing the problem of an insufficient dynamic range when using the SiPM in cooperation with the scintillation crystal, and effectively easing a contradiction between a wide range of counting rate and the requirement of high sensitivity.

The third type of positional relationship is described below, in which the other types of scintillation crystals are arranged at the outer side of one of ray incidence planes of the scintillation crystal B module.

The scintillation crystal B module includes: a first abutting plane coupled with a silicon photomultiplier device, a second abutting plane opposite to the first abutting plane and multiple sides connecting the first abutting plane to the second abutting plane and receiving rays. The multiple sides each function as the ray incidence plane of the scintillation crystal B module. The at least one scintillation crystal A module is arranged on the outside of one of the sides of the scintillation crystal B module. The technical solutions are for some special applications in which detection in just one direction is in need. In this case, it only needs to arrange all the scintillation crystal A modules on the outside of one of the sides of the scintillation crystal B module.

The at least one scintillation crystal module A has an area greater than or equal to an area of a ray incidence plane after being arranged. The technical solution ensures all low-energy rays to be largely deposited in the scintillation crystals A of a high photon efficiency and all high-energy rays to be largely deposited in the scintillation crystals B, thus directly and effectively addressing the problem of an insufficient dynamic range when using the SiPM in cooperation with the scintillation crystal, and effectively easing a contradiction between a wide range of counting rate and the requirement of high sensitivity.

The at least one scintillation crystal A module is arranged from a place adjacent to the ray incidence plane of the scintillation crystal B module to the outside. By adjacently and closely arranging the scintillation crystal A module and the scintillation crystal B module, the effect of ray incidence and deposition is guaranteed.

In the first embodiment, the scintillation crystal A module and the scintillation crystal B module may be continuous scintillation crystals or an array of scintillation crystals according to the practical situation.

A second embodiment (three or more types of different performance of scintillation crystals are included)

A combined scintillation crystal disclosed in the present disclosure includes: X types of scintillation crystals with different performances, where X≥3. The sensitivity of a first type of scintillation crystal in the X types of scintillation crystals with different performances is higher than the sensitivity of the other types of scintillation crystals, and the light output ability of the first type of scintillation crystal in the X types of scintillation crystals with different performances is lower than the light output ability of the other types of scintillation crystals. All the first type of scintillation crystal forms a scintillation crystal B module in an integral structure, and the scintillation crystal B module has a ray incidence plane to receive rays. The other types of scintillation crystals are arranged on the outer side of the ray incidence plane of the scintillation crystal B module. By choosing a scintillation crystal A and a scintillation crystal B with different performances, the present technical solutions address the problem of a contradiction between the sensitivity and a linearity of counting rate by using a parameter difference between different scintillation crystals, and can break the "bottle neck" of a finite dynamic range of a SiPM by reasonable parameter selection.

In the second embodiment, there are three types of positional relationship of the scintillation crystal B module and other types of scintillation crystals. In a first type of positional relationship, the scintillation crystal B module is completely enclosed by the other types of scintillation crystals at the location of a ray incidence plane. In a second type of positional relationship, the scintillation crystal B module is incompletely enclosed by the other types of scintillation crystals at the location of a ray incidence plane. In a third type of positional relationship, the other types of scintillation crystals are arranged at the outer side of one of ray incidence planes of the scintillation crystal B module. The embodiment is described in detail as follows.

The first type of positional relationship is described below, in which the scintillation crystal B module is completely enclosed by the other types of scintillation crystals at the location of a ray incidence plane.

The scintillation crystal B module includes: a first abutting plane coupled with an external silicon photomultiplier device, a second abutting plane opposite to the first abutting plane and multiple sides connecting the first abutting plane to the second abutting plane and receiving rays. The multiple sides each function as the ray incidence plane of the scintillation crystal B module. The other types of scintillation crystals are arranged respectively on the periphery of the sides of the scintillation crystal B module, and the whole of the other types of scintillation crystals are arranged around all sides and completely enclose the scintillation crystal B module from the periphery of sides. By completely enclosing the scintillation crystal B module in the present technical solution, not only rays irradiate the combined scintillation crystals from different directions, but also the complete enclose further guarantees the effect of ray deposition, so that it is convenient to acquire effective and easy-processing signal data. The complete enclosing can also make sure that the response obtained from each direction is consistent when the crystals are arranged symmetrically.

All the other types of scintillation crystals are arranged symmetrically about the scintillation crystal B module in at least one direction. By using the symmetric arrangement in the present technical solutions, the obtained responses in the two symmetry directions are consistent.

All the other types of scintillation crystals are arranged in an area greater than or equal to an area of the ray incidence plane and enclose the scintillation crystal B module. The technical solution ensures all low-energy rays to be largely deposited in the scintillation crystals A of a high photon efficiency and all high-energy rays to be largely deposited in the scintillation crystals B, thus directly and effectively addressing the problem of an insufficient dynamic range when using the SiPM in cooperation with the scintillation crystal, and effectively easing a contradiction between a wide range of counting rate and the requirement of high sensitivity.

The second type of positional relationship is described below, in which the scintillation crystal B module is incompletely enclosed by the other types of scintillation crystals at the location of a ray incidence plane.

The scintillation crystal B module includes: a first abutting plane coupled with an external silicon photomultiplier device, a second abutting plane opposite to the first abutting plane and multiple sides connecting the first abutting plane to the second abutting plane and receiving rays. The multiple sides each function as the ray incidence plane of the scintillation crystal B module. The other types of scintillation crystals are arranged respectively on the periphery of at least two sides of the scintillation crystal B module, and the whole of the other types of scintillation crystals enclose incompletely the scintillation crystal B module from the periphery of sides. The technical solutions are for some specific applications in which it is unnecessary to detect in all directions. It can cut the cost by incompletely enclosing the scintillation crystal B module.

All the other types of scintillation crystals are arranged symmetrically about the scintillation crystal B module in at least one direction. By using the symmetric arrangement in the present technical solutions, the obtained responses in the two symmetry directions are consistent.

All the other types of scintillation crystals enclosing the scintillation crystal B module are arranged in an area greater than or equal to an area of the ray incidence plane. The technical solution ensures all low-energy rays to be largely deposited in the scintillation crystals A of a high photon efficiency and all high-energy rays to be largely deposited in the scintillation crystals B, thus directly and effectively addressing the problem of an insufficient dynamic range when using the SiPM in cooperation with the scintillation crystal, and effectively easing a contradiction between a wide range of counting rate and the requirement of high sensitivity.

The third type of positional relationship is described below, in which the other types of scintillation crystals are arranged at the outer side of one of ray incidence planes of the scintillation crystal B module.

The scintillation crystal B module includes: a first abutting plane coupled with an external silicon photomultiplier device, a second abutting plane opposite to the first abutting plane and multiple sides connecting the first abutting plane to the second abutting plane and receiving rays. The multiple sides each function as the ray incidence plane of the scintillation crystal B module. All the other types of scintillation crystals are arranged on the outside of one of the sides of the scintillation crystal B module. The technical solutions are for some special applications that detection in just one direction is in need. Therefore it only needs to arrange all scintillation crystal A modules on the outer side of one of the sides of the scintillation crystal B module.

All the other types of scintillation crystals have an area greater than or equal to an area of a ray incidence plane after being arranged. The technical solution ensures all low-energy rays to be largely deposited in the scintillation crystals A of a high photon efficiency and all high-energy rays to be largely deposited in the scintillation crystals B, thus directly and effectively addressing the problem of an insufficient dynamic range when using the SiPM in cooperation with the scintillation crystal, and effectively easing a contradiction between a wide range of counting rate and the requirement of high sensitivity.

All the other types of scintillation crystals are arranged from a place adjacent to the ray incidence plane of the scintillation crystal B module to the outside.

For all the above technical solutions in the second embodiment, the arrangement of the other types of scintillation crystals relative to the scintillation crystal B module satisfies a condition that the sensitivity gradually decreases and the light output ability gradually increases in the direction of being away from the scintillation crystal B module. The technical solution follows the design principle for the case that only two types (i.e., A and B) of detectors exist. When there are more than two types of detectors, to better attain the objective of the present disclosure, the arrangement principles are taken as that the outmost scintillation crystals have lower sensitivity and higher light output capability than the inner scintillation crystals. When multiple types of scintillation crystals are arranged in superposition relative to a ray incidence plane of the scintillation crystal B module, for each adjacent two lays of scintillation crystals, the light output capability of the outer layer of scintillation crystals is higher than the light output capability of the inner layer of scintillation crystals, and the sensitivity of the outer layer of scintillation crystals is lower than the sensitivity of the inner layer of scintillation crystals.

In the second embodiment, the scintillation crystal may be a continuous scintillation crystal or an array of scintillation crystals according to the practical situation.

Figure 2:
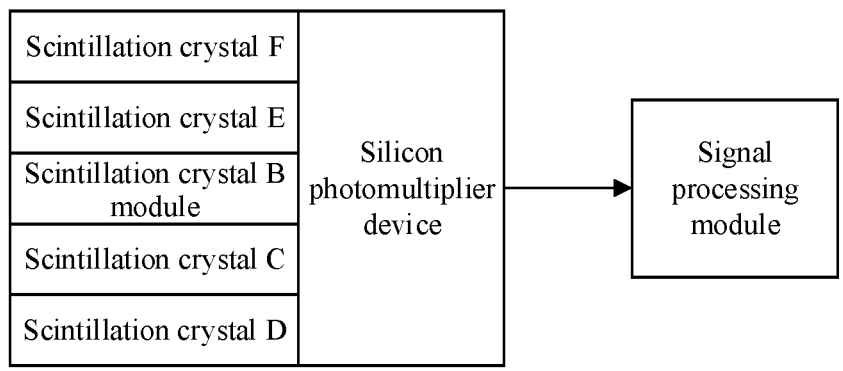
FIG. 2 is a structure diagram illustrating a combined scintillation detector including five types of scintillation crystals provided in the present disclosure.

FIG. 2 shows a combined scintillation detector structure including five types of scintillation crystals, which is a plane graph only illustrating two ray incidence planes of the detector structure. If there are other un-shown ray incidence planes arranged with multiple types of scintillation crystals, the arrangement is similar. In FIG. 2, a scintillation crystal B module with the highest sensitivity and the lowest light output capability is located in the innermost layer. Scintillation crystal C and scintillation crystal D are arranged at one side of one of ray incidence planes of the scintillation crystal B module. The sensitivity of the scintillation crystal C is lower than the sensitivity of the scintillation crystal B module, while the light output capability of the scintillation crystal C is higher than the light output capability of the scintillation crystal B module. The sensitivity of the scintillation crystal D is lower than the sensitivity of the scintillation crystal C module, while the light output capability of the scintillation crystal D is higher than the scintillation crystal C module. Scintillation crystal E and scintillation crystal F are arranged at one side of the other ray incidence plane of the scintillation crystal B module. The sensitivity of the scintillation crystal E is lower than the scintillation crystal B module, while the light output capability of the scintillation crystal E is higher than the light output capability of the scintillation crystal B module. The sensitivity of the scintillation crystal F is lower than the sensitivity of scintillation crystal module E, while the light output capability of the scintillation crystal F is higher than the scintillation crystal module E.

Figure 3:
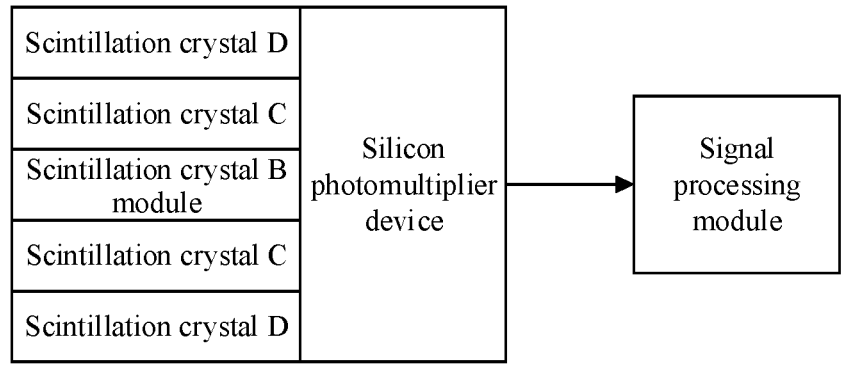
FIG. 3 is a structure diagram illustrating a combined scintillation detector including three types of scintillation crystals provided in the present disclosure.

If there are incident rays onto symmetric ray incidence planes, the optimum implementation mode is that, taking the scintillation crystal B module as a symmetry point, scintillation crystals at two sides of the symmetric ray incidence planes of the scintillation crystal B module are symmetrical and have the same sensitivity and light output capability. Referring to FIG. 3, in order to facilitate the later data processing, taking the scintillation crystal B module as a symmetry point, scintillation crystals C are symmetrically arranged at the outer side of the scintillation crystal B module, and scintillation crystals D are symmetrically arranged at the outer side of the scintillation crystals C. The sensitivity of scintillation crystals C is lower than the sensitivity of the scintillation crystal B module while the light output capability of scintillation crystals C is higher than the light output capability of the scintillation crystal B module. The sensitivity of scintillation crystals D is lower than the sensitivity of the scintillation crystals C while the light output capability of scintillation crystals D is higher than the light output capability of the scintillation crystals C.

Based on the combined scintillation crystal structure in the above first embodiment and the second embodiment, the present disclosure also provides a SiPM-based combined scintillation detector structure with the combined scintillation crystal structure described in the first embodiment and the second embodiment. The combined scintillation detector includes: a silicon photomultiplier device, a signal processing module and the above combined scintillation crystal structure, which can address the problem of a contradiction between the sensitivity and a linearity of counting rate and can break the "bottle neck" of a finite SiPM dynamic range by using a parameter difference between scintillation crystals.

Also disclosed in the present disclosure is a radiation detection device with the above combined scintillation detector structure. The radiation detection device includes: a shell, a displayer and the combined scintillation detector structure described in the first embodiment and the second embodiment, which can address the problem of a contradiction between the sensitivity and a linearity of counting rate and can break the "bottle neck" of a finite SiPM dynamic range by using a parameter difference between scintillation crystals.

Figure 4:
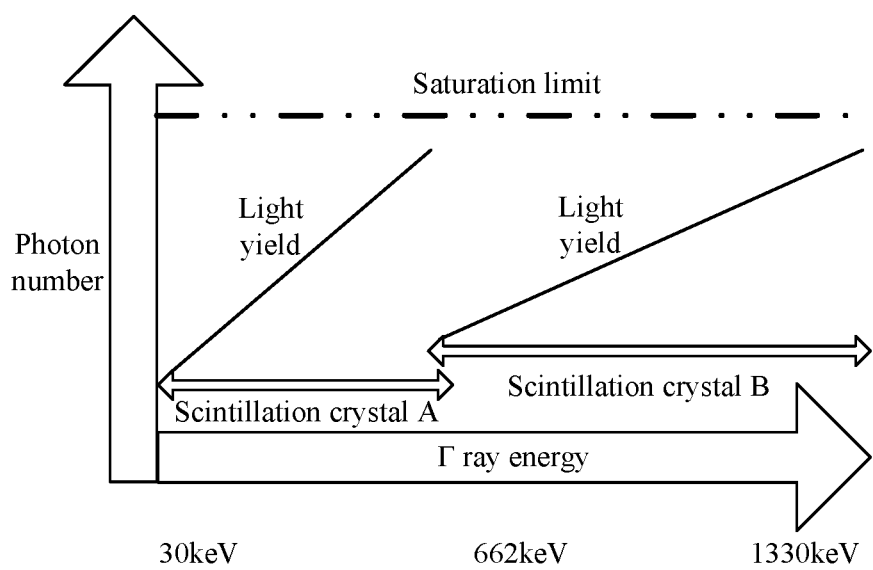
FIG. 4 is a diagram illustrating a light yield saturation curve of a combined scintillation detector provided in the present disclosure.

It is required in the present disclosure that, scintillation crystals A are arranged at the outer side of a ray incidence plane of scintillation crystal B, and preferably completely enclose the scintillation crystal B from the periphery of a ray incidence plane of the scintillation crystal B. In this way, a great amount of low-energy rays are deposited in the scintillation crystal A, and high-energy rays will pass through the scintillation crystal A with a low linear attenuation coefficient and enter the scintillation crystal B. Once the photon efficiency of the scintillation crystal A is obtained, the γ ray energy value of a photon number which makes SiPM saturated can be determined. The SiPM manufacturer will provide the photon saturation parameter (Imax) of a SiPM. Referring to Formula 1, E denotes γ ray energy, I denotes a photon number. If I<Imax, it is in a linear operating range. As shown in FIG. 4, X denotes Γ ray energy, Y denotes a photon number, Z denotes photo yield, H denotes a saturation limit, J denotes scintillation crystal A and K denotes scintillation crystal B.

$$I = \lambda E \qquad \text{(Formula 1)}$$

Once the γ ray energy at the time when scintillation crystal A is saturated is determined, the thickness d0 of the scintillation crystal A can be determined according to the linear attenuation coefficient μ of the scintillation crystal.

$$N = N_0 e^{-\mu d} \qquad \text{(Formula 2)}$$

At this point, the structure and parameters of a combined scintillation detector are determined. Peripheral scintillation crystals A with a high photon efficiency detect low-energy γ rays, and high-energy rays which can be deposited in scintillation crystals A to make SiPM saturated will pass through scintillation crystals A and be deposited in scintillation crystals B of a low photon efficiency, thus broadening the dynamic range of the whole detector.

Since different scintillation crystals have different light decay time constants, pulse signal forms can be used to distinguish signals from scintillation crystals A and scintillation crystals B for further processing.

The multiple types of scintillation crystals described in embodiments of the present disclosure can be selected according to practical applications, and the specific type of scintillation crystals is not a key protection point of the present disclosure. The key protection point of the present disclosure lies in that, when there are two or more types of scintillation crystals, how to solve the technical problems by properly arranging the scintillation crystals with different performances based on the performance of the scintillation crystals. That is, by choosing scintillation crystals with different performances, the problem of a contradiction between the sensitivity and a linearity of counting rate is addressed by using a parameter difference between different scintillation crystals, and the "bottle neck" of a finite dynamic range of a SiPM is broke by reasonable parameter selection. Specifically, by arranging a scintillation crystal with low sensitivity and high light output capability at the periphery of a scintillation crystal with high sensitivity and low light output capability, a great amount of low-energy rays is deposited in the scintillation crystals with a high photon efficiency, and a great amount of high-energy rays is deposited in the scintillation crystals with a low photon efficiency, thus avoiding SiPM saturation caused by the generation of excessive photons, effectively addressing the problem of an insufficient dynamic range when using the SiPM in cooperation with the scintillation crystal, and effectively easing a contradiction between a wide range of counting rate and the requirement of high sensitivity.

The invention claimed is:

1. A combined scintillation crystal, comprising:
   X types of scintillation crystals, each of the X types of scintillation crystals capable of converting incident rays to light output with different performances, where X≥2; wherein:
   the sensitivity to the incident rays of a first type of scintillation crystal in the X types of scintillation crystals with different performances is higher than the sensitivity to the incident rays of the other types of scintillation crystals, and the light output ability of the first type of scintillation crystal in the X types of scintillation crystals with different performances when receiving the incident rays is lower than the light output ability of the other types of scintillation crystals;
   all the first type of scintillation crystal forms a scintillation crystal B module in an integral structure, the scintillation crystal B module comprises: a first abutting end face coupled with an external silicon photomultiplier device, a second abutting end face opposite to the first abutting end face and a plurality of side faces connecting the first abutting end face to the second abutting end face and wherein the plurality of side faces are configured to receive the incident rays;
   the plurality of side faces each function as a ray incidence surface of the scintillation crystal B module, and the ray incidence surface is different from the first abutting end face and the second abutting end face; and
   the other types of scintillation crystals are arranged on the outer side of the ray incidence surface of the scintillation crystal B module such that the incident rays received by the ray incidence surface of the scintillation crystal B first pass through the other types of scintillation crystals.

2. The combined scintillation crystal according to claim 1, wherein the arrangement of the other types of scintillation crystals relative to the scintillation crystal B module satisfies a condition that the sensitivity gradually decreases and the light output ability gradually increases in the direction of being away from the scintillation crystal B module.

3. The combined scintillation crystal according to claim 1, wherein each of the other types of scintillation crystals comprises an even number of scintillation crystals, and the even number of scintillation crystals are symmetrically arranged at the outer side of any two symmetric ray incidence surfaces of the scintillation crystal B module, with the scintillation crystal B module as a symmetry point.

4. The combined scintillation crystal according to claim 1, wherein
   the other types of scintillation crystals are arranged respectively on the periphery of each of the side faces of the scintillation crystal B module, and the whole of the other types of scintillation crystals are arranged around all the side faces and completely enclose the periphery of the scintillation crystal B module.

5. The combined scintillation crystal according to claim 4, wherein the arrangement of the other types of scintillation crystals relative to the scintillation crystal B module satisfies a condition that the sensitivity gradually decreases and the light output ability gradually increases in the direction of being away from the scintillation crystal B module.

6. The combined scintillation crystal according to claim 4, wherein each of the other types of scintillation crystals are arranged symmetrically about the scintillation crystal B module in at least one direction.

7. The combined scintillation crystal according to claim 4, wherein all the other types of the scintillation crystals are arranged in an area greater than or equal to an area of the ray incidence surface and enclose the scintillation crystal B module.

8. The combined scintillation crystal according to claim 1, wherein
   the other types of scintillation crystals are arranged respectively on the periphery of at least two of the sides of the scintillation crystal B module, and the whole of the other types of scintillation crystals incompletely enclose the scintillation crystal B module from the periphery of sides.

9. The combined scintillation crystal according to claim 8, wherein the arrangement of the other types of scintillation crystals relative to the scintillation crystal B module satisfies a condition that the sensitivity gradually decreases and the light output ability gradually increases in the direction of being away from the scintillation crystal B module.

10. The combined scintillation crystal according to claim 8, wherein each of the other types of scintillation crystals are arranged symmetrically about the scintillation crystal B module in at least one direction.

11. The combined scintillation crystal according to claim 8, wherein all the other types of the scintillation crystals enclosing the scintillation crystal B module are arranged in an area greater than or equal to an area of the ray incidence surface.

12. The combined scintillation crystal according to claim 1, wherein
all the other types of scintillation crystals are arranged on the outer side of one of the sides of the scintillation crystal B module.

13. The combined scintillation crystal according to claim 12, wherein the arrangement of the other types of scintillation crystals relative to the scintillation crystal B module satisfies a condition that the sensitivity gradually decreases and the light output ability gradually increases in the direction of being away from the scintillation crystal B module.

14. The combined scintillation crystal according to claim 12, wherein after being arranged, the area of a surface of all the other types of scintillation crystals abutting on the ray incidence surface is greater than or equal to the area of the ray incidence surface.

15. A combined scintillation detector, comprising a SiPM device and a signal processing module, wherein the combined scintillation detector comprises the combined scintillation crystal according to claim 1.

16. A radiation detection device, comprising a shell and a displayer, wherein the radiation detection device comprises the combined scintillation detector according to claim 15.

17. A combined scintillation crystal array, comprising:
at least two first scintillation crystals, each including a first abutting end face coupled with an external silicon photomultiplier device, a second abutting end face opposite to the first abutting end face, and a plurality of side faces, and
at least one second scintillation crystal, including a first abutting end face coupled with the external silicon photomultiplier device, a second abutting end face opposite to the first abutting end face, and a plurality of side faces,
wherein the at least one second scintillation crystal is sandwiched between the at least two first scintillation crystals,
wherein the sensitivity to incident rays of the at least one second scintillation crystal is higher than the sensitivity to the incident rays of the first scintillation crystals;
wherein the at least two first scintillation crystals each have a light output ability lower than a light output ability of the at least one second scintillation crystal;
wherein the at least two first scintillation crystals each have a thickness smaller than a thickness of the at least one second scintillation crystal;
wherein at least one of the side faces of the at least two first scintillation crystals is configured as the ray incidence surface of the first scintillation crystal, and at least one of the side faces of the at least one second scintillation crystal is configured as the ray incidence surface of the second scintillation crystal such that prior to being received by the ray incidence surface of the at least one second scintillation crystal, the incident rays first pass through at least one of the first scintillation crystals.

18. The combined scintillation crystal array according to claim 17, wherein the at least one second scintillation crystal includes at least a pair of the incidence surfaces opposed to each other, and wherein the at least two first scintillation crystals are arranged on the outer side of the at least a pair of the incidence surfaces.

19. The combined scintillation crystal array according to claim 17, wherein the at least two first scintillation crystals are arranged around all the side faces of the at least one second scintillation crystal and thus completely enclose the periphery of the at least one second scintillation crystal.

20. A combined scintillation detector, comprising a SiPM device and a signal processing module, wherein the combined scintillation detector comprises the combined scintillation crystal array according to claim 17.

* * * * *